(12) United States Patent
Johnson et al.

(10) Patent No.: US 6,600,962 B1
(45) Date of Patent: Jul. 29, 2003

(54) SENSOR CONTROLLER

(75) Inventors: Jerry R. Johnson, Rathdrum, ID (US); Jesse Russell, Cary, NC (US); Glenn A. Beusch, Hot Springs, SD (US); Eckart Garneyer, Ludenscheid (DE)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/410,408

(22) Filed: Oct. 1, 1999

Related U.S. Application Data

(63) Continuation-in-part of application No. 09/125,334, filed on Nov. 23, 1998, now Pat. No. 6,369,563.
(60) Provisional application No. 60/103,049, filed on Oct. 5, 1998.

(51) Int. Cl.$^7$ .............................................. G05B 19/18
(52) U.S. Cl. ........................... 700/66; 700/56; 73/1.33; 73/1.73; 367/156; 367/168
(58) Field of Search ...................... 700/59, 66; 367/156, 367/168; 335/3, 215; 360/328; 336/20; 73/862.333

(56) References Cited

U.S. PATENT DOCUMENTS

| | | | | |
|---|---|---|---|---|
| 4,678,993 A | * | 7/1987 | Vinnemann et al. | 324/207.13 |
| 5,076,100 A | * | 12/1991 | Hunter et al. | 73/290 V |
| 5,136,884 A | * | 8/1992 | Lovett | 73/313 |
| 5,253,521 A | * | 10/1993 | Abramovich et al. | 73/306 |
| 5,334,933 A | * | 8/1994 | Tellerman | 324/207.13 |
| 5,347,849 A | * | 9/1994 | Reeme et al. | 73/49.2 |
| 5,535,625 A | * | 7/1996 | Levy | 73/290 V |
| 5,979,233 A | * | 11/1999 | Johnson | 73/149 |
| 6,087,934 A | * | 7/2000 | Golab | 340/540 |

OTHER PUBLICATIONS

Voutilainen et al., "The Measurement of the piston Velocity of a Hydraulic Actuator", Jun. 1989, IEEE Transactions on Instrumentation and Measurement, vol. 38, No. 3, pp. 815–819.*

Nishibe et al., "Real Time Measurement of Instantaneous Torque by Magnetostrictive Sensor", May 1991, IEEE, pp. 412–414.*

Tsodikov et al., "Magnetostrictive Force Actuators for Superprecise Positioning", Mar. 1998, IEEE 18th Int. Symp. On Discharges and Electrical Insulation in Vacuum, pp. 713–719.*

* cited by examiner

Primary Examiner—Thomas Black
Assistant Examiner—Crystal J Barnes
(74) Attorney, Agent, or Firm—David M. Ostfeld

(57) ABSTRACT

A control system for controlling a variable of a device by an end element is disclosed. The control system has as its input a magnetostrictive position sensing probe for measuring the value of the variable of the device at time intervals and a digital controller reading the value from the magnetostrictive position sensing probe and having an output and means for calculating control output from the updated value of the variable during the time interval. The digital controller is close coupled to the magnetostrictive position sensing probe to permit time intervals that are very short, such as 500 microseconds to 1 millisecond.

25 Claims, 8 Drawing Sheets

SENSOR CONTROLLER

This is a of U.S. application Ser. No. 60/103,049, filed Oct. 5, 1998, entitled Sensor Controller which is a continuation in part of U.S. application Ser. No. 09/125,334, with a filing date of Nov. 23, 1998, entitled Method For High Resolution Measurement of a Time Period, and is now U.S. Pat. 6,369,563, issued Apr. 9, 2002, which application Ser. No. 09/125,334 is incorporated herein by reference for all purposes.

BACKGROUND OF THE INVENTION

1. Field of the Invention

The present invention relates to systems for measuring parameters with elongated waveguides in magnetostrictive displacement and liquid level or distance measuring transducers, and more particularly to controllers for control of the measured parameters.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555. A preferred sensor element for such measurement is the SE2 sensor sold by MTS which includes a SARA measuring unit. The prior art also shows controllers and regulators that control, including locally, a measured signal, the local controllers being analog electrical or pneumatic or hydraulic systems.

Absolute encoders and linear transducers with incremental interfaces are also known in the art, such as those produced by TR Encoder Solutions.

No controllers of the prior art are close coupled to magnetostrictive devices and inside a magnetostrictive device cover. No controllers of the prior art run at one millisecond or better rates, such as one-half millisecond, on a digital basis calculating control changes.

It is an object of the present invention to provide digital magnetostrictive position sensing elements that can be used in digital control applications with analog or digital output.

It is further object of the present invention to produce a magnetostrictive position sensor probe and controller close coupled for very fast data input, for example, used in machine control.

It is a further object of the present invention to produce a magnetostrictive position sensor probe and controller with very fast control cycles, such as one millisecond or less.

It is also an object of the present invention to produce a microcontroller.

SUMMARY OF THE INVENTION

The present invention relates to a control system for a magnetostrictive position sensing probe that can be used in applications where the waveguide measures a variable that needs to be controlled, for example, a machine tool with a magnetostrictive measuring parameter such as distance of extension of an arm. Distance measurements may be made to a magnet carried by the piston of an hydraulic cylinder. A controller using a magnetostrictive sensor is especially useful for control systems that require high frequency update, such as, a full new reading every millisecond. The controller also may accept direct digital inputs represented as a variable to be measured, thereby decreasing the conversion time from an analog to a digital signal. The control system may be used in magnetostrictive displacement applications, for linear measurements with any magnetostrictive sensing device known in the prior art or yet to be determined.

The controller may be used to drive servo valves or proportional valves or external driver assemblies or motion powered devices or servo motors or the like ("output devices") and may also through its computer communicate through a serial port with programmable computers or programmable logic controllers or human interface devices and the like ("hierarchy"). The controller may also be connected directly to parallel digital input such as the input from a SARA counter or from a serial input such as the encoder as is well known in the art. The controller includes a microprocessor having interrupts to use the serial port of the microprocesser to supply data in the hierarchy and to accept parameters for use in the control algorithms and the like and to accept targets or set points for the controller. The computer of the controller also includes interrupts for the real time clock or timer and finally has an interrupt when position data is available from systems such as the SARA. It can also receive serial port input data such as from an encoder. Thus, no particular magnetostrictive sensor will be described, but only depicted generally in the descriptions of the invention below, although the MTS SE2 magnetostrictive sensor, using a SARA counter, is the presently preferred device.

The controller is close-coupled to the magnetostrictive device, usually being inside the cap of the magnetostrictive device, and having a frequency of one millisecond and up, preferably under five hundred microseconds, especially because of the close-coupling. Thus, the controller is micro-sized to permit it to be included within the normal housing of the magnetostrictive device.

DESCRIPTION OF THE DRAWINGS

For a further understanding of the nature and objects of the present invention, reference should be had to the following figures in which like parts are given like reference numerals and wherein.

DETAILED DESCRIPTION OF THE PREFERRED AND ALTERNATE EMBODIMENT

Figure 1:
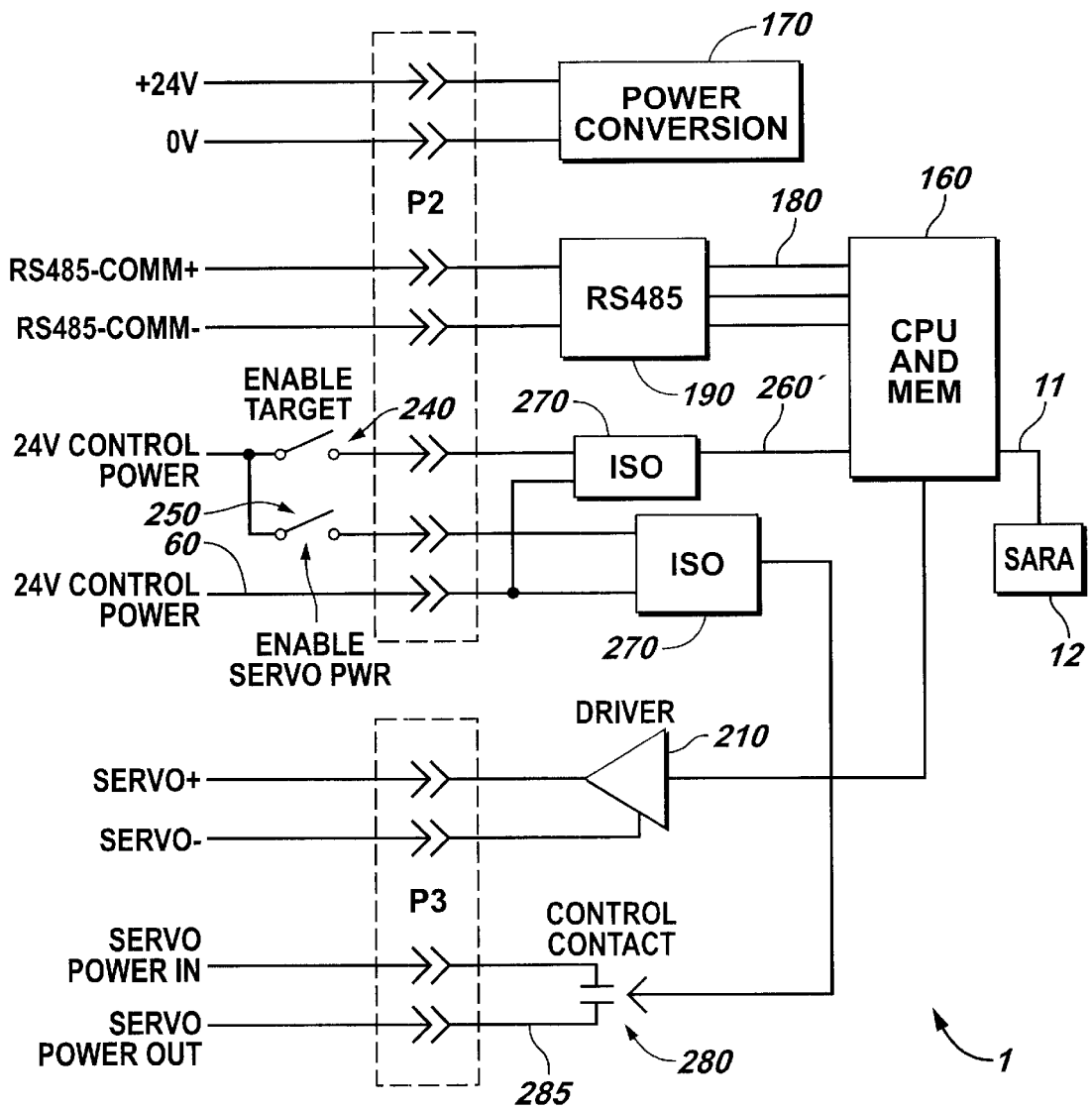
FIG. 1 is a block diagram of the control system of the preferred embodiment of the present invention.

Control system 1 for use with the digital reading or parallel input lines 11 (FIG. 2 or FIG. 1) from an encoder 150 (FIG. 5) or a SARA unit or output device 12 which may include several RTD's 34 and voltage references 32 (see U.S. patent application Ser. No. 09/125,334, now U.S. Pat. No. 6,369,563) (FIGS. 4 and 8) from a sensor element assembly 14, 26, 30 (FIGS. 4 and 8) or a sensor associated with the encoder 150 (FIG. 5) is shown in FIGS. 1, 2, 4, 5 and 8. For the preferred embodiment, the transducer or sensing element 14 and the interrogation pulse 26 and comparator 30 may be any magnetostrictive or other transducer, including those of the prior art such as that shown in U.S. Pat. No. 3,898,555 or any other transducer presently on the market or may be introduced in the future, including the SE1 or SE2 sensing element assemblies sold by MTS which can be used with the SARA 12. Transducer 14 maybe used for measuring displacements of, for example, an arm 70 (FIG. 8) and/or distances or other measurements and the control system 1 of the present invention will be applicable to any of them. The general type of transducer 14 should not be deemed as limiting the disclosure of the control system 1, and the disclosure of the control system 1 should not be deemed to be limited by the waveguide 14 construction and should not be deemed to be limited by the mode converter or other electronics (not shown). Further the general nature of the transducer 14 as electrically producing only the return pulse and interfacing on that basis with any electronics of a buyer or user of the device should not be deemed to be limiting the disclosure of the control system.

Figure 2:
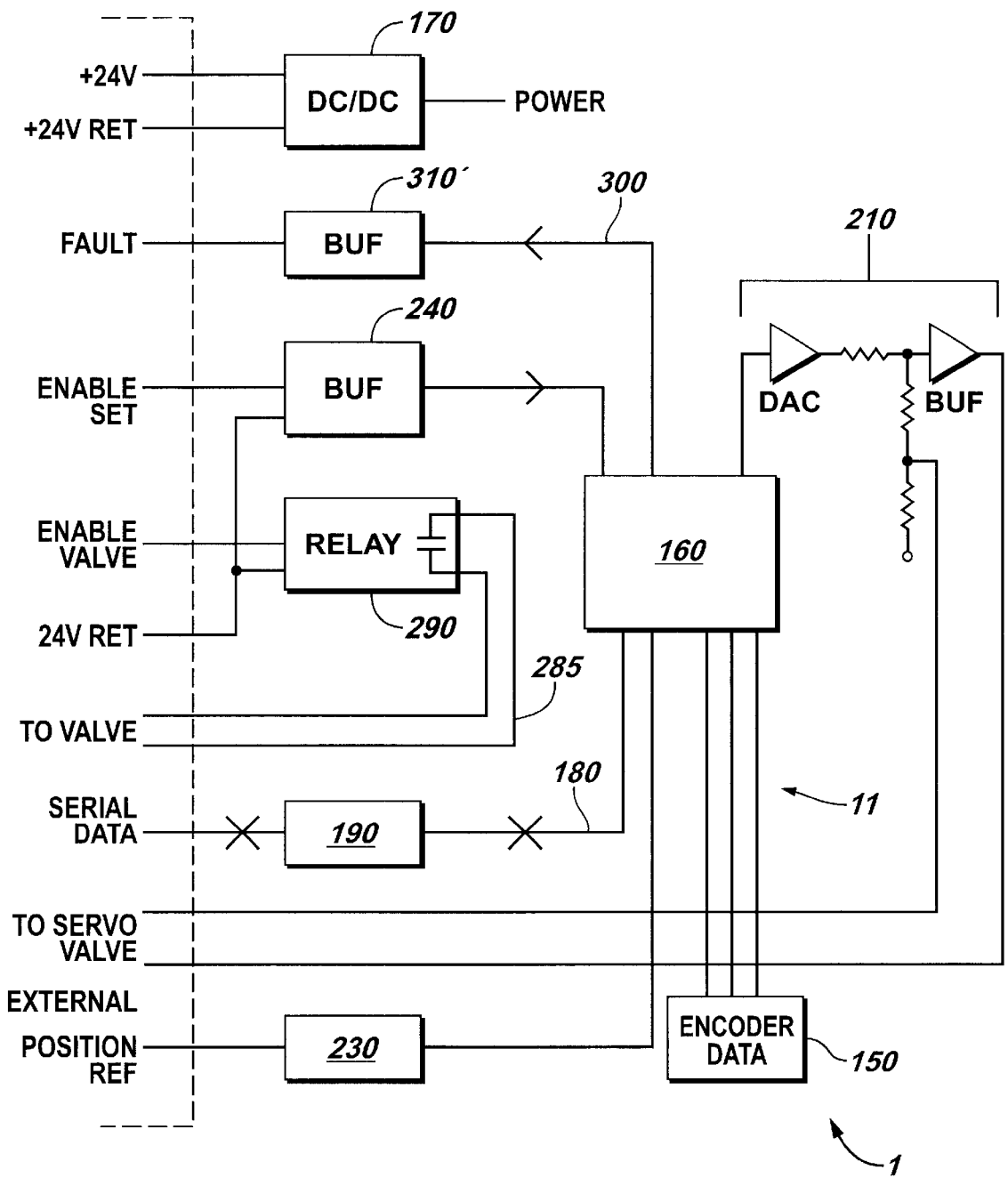
FIG. 2 is a block diagram of the control system of an alternate embodiment of the present invention.
Figure 5:
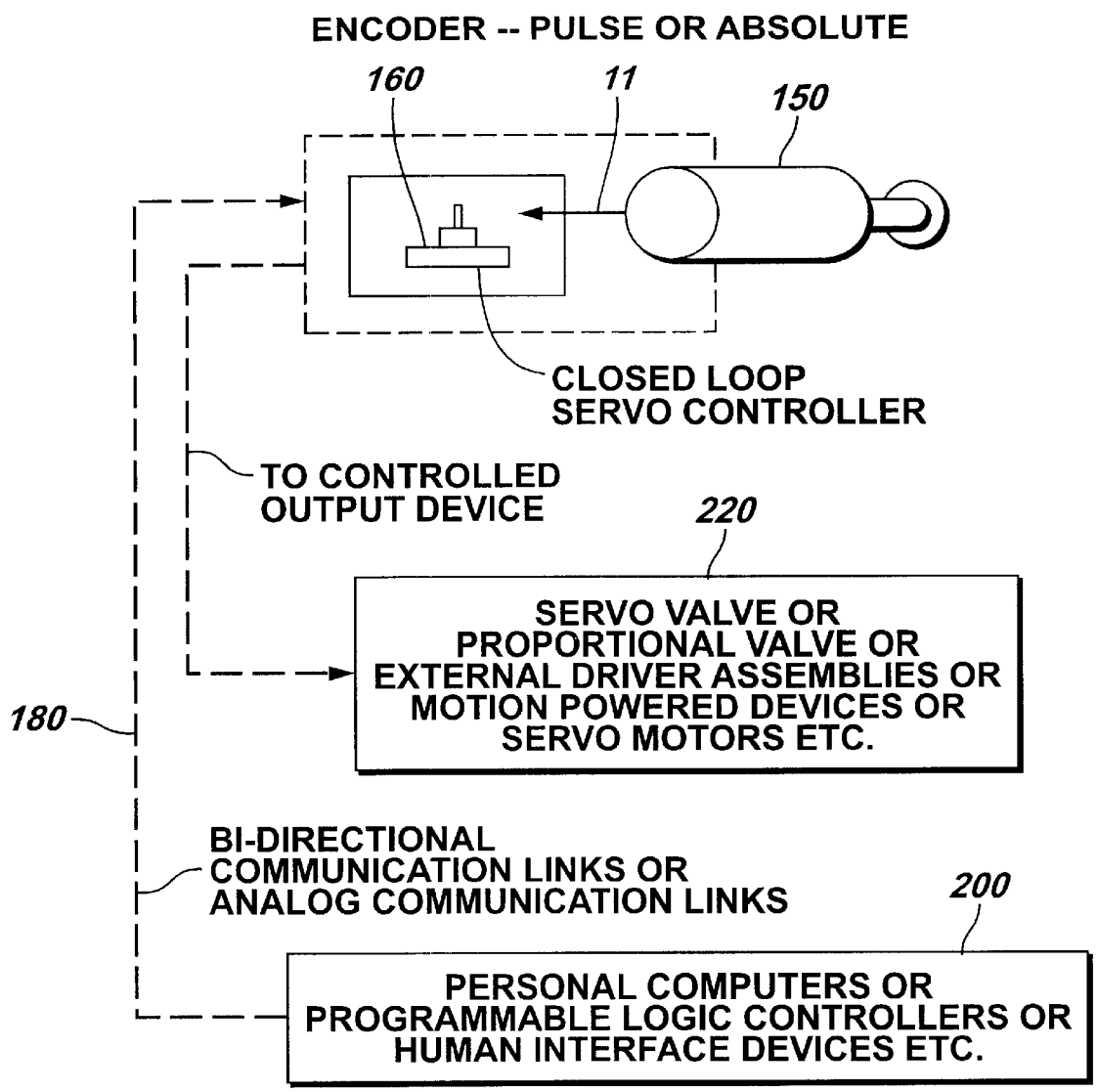
FIG. 5 is a block diagram of the components of the alternate embodiment of the encoder.
Figure 7:
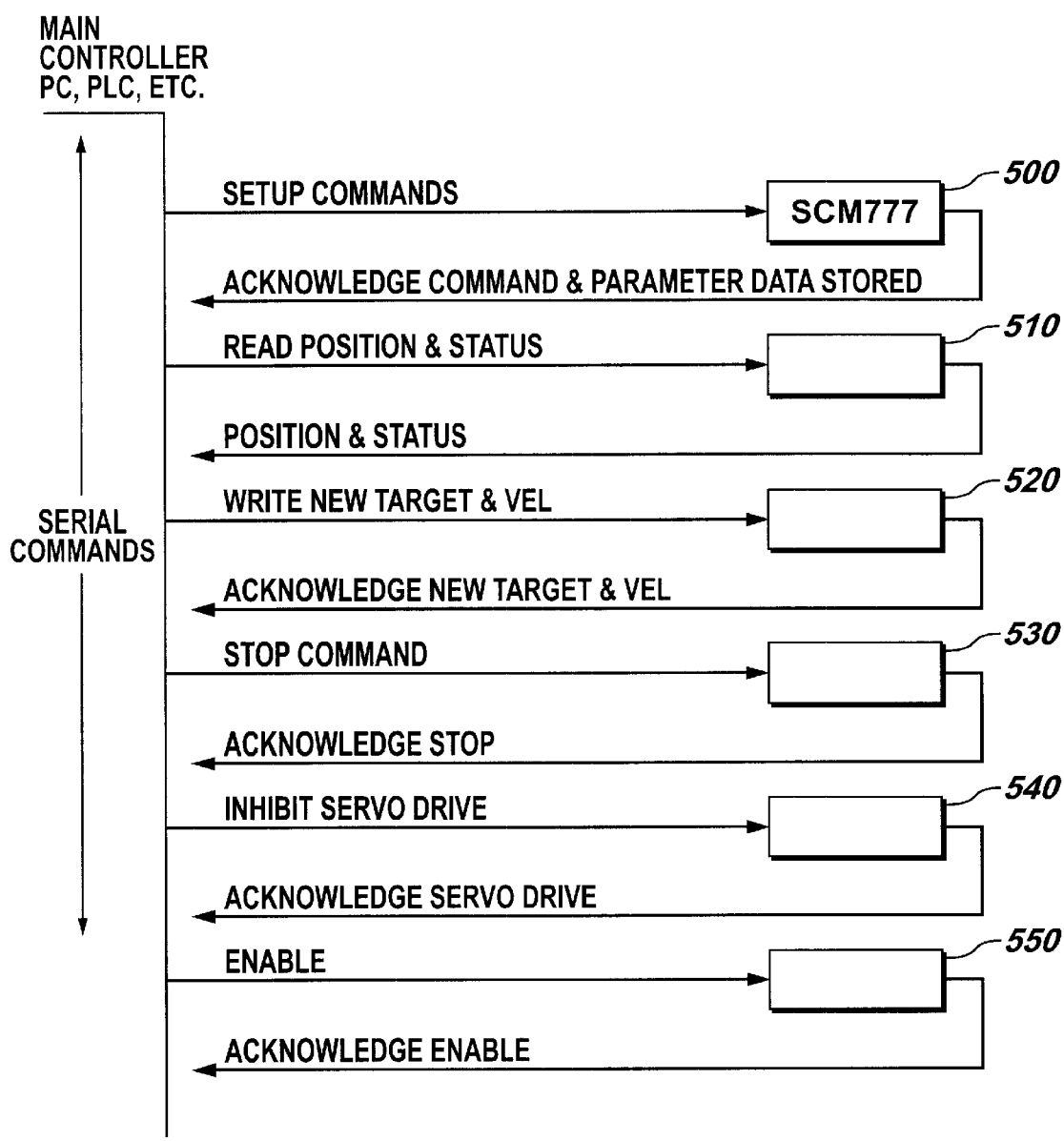
FIG. 7 is an operation command list of the hierarchy.
Figure 8:
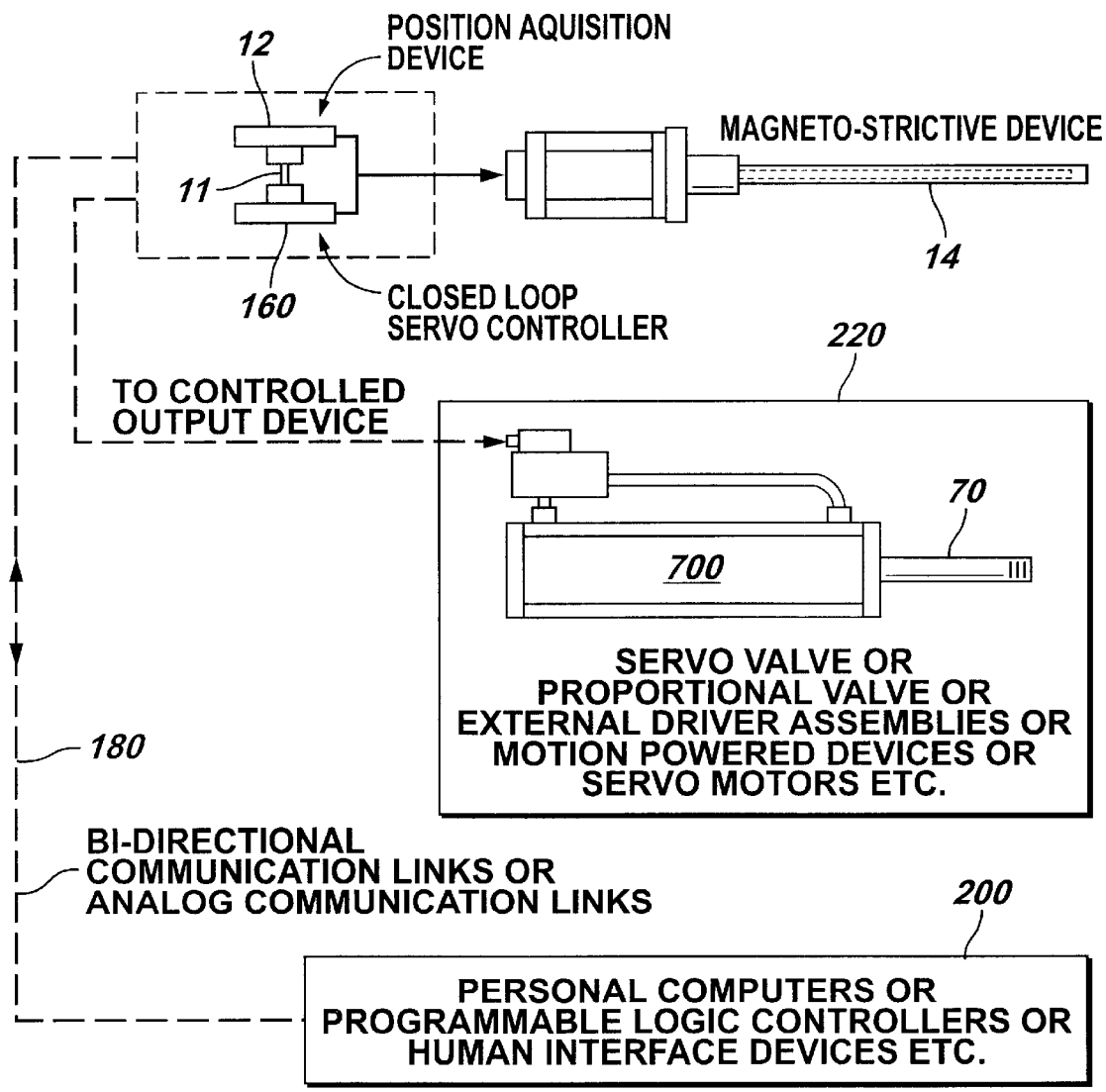
FIG. 8 is a block diagram of the components at the preferred embodiment of the magnetostrictive sensor.

The parallel digital input lines 11 from the SARA 12 are connected to a computer 160 having EEPROM 18 and clock 24. The computer 160 is connected to its power source 170 and power on reset 22 and also to a serial port 180, port 180 being connected to an RS485,190. This permits the computer 160 to communicate with a remote hierarchical system 200 (FIGS. 5 and 8). From this remote or hierarchical system 200, computer 160 may receive commands to supply data or to receive a parameter, such as a control tuning parameter or to receive a target or setpoint to match the measurement from the magnetostrictive device 14 or the encoder 150 through an output device 220 and other signals as detailed below and in FIG. 7. To cause the control system 1 to operate and adjust the reading from the magnetostrictive device 14 as a result of a response, of computer 160 through output device 220, computer 160 also has analog output drivers generally shown as 210 in FIGS. 1 and 2. As shown in FIG. 2, the reference signal or target or setpoint maybe manually put into the system 1 by reference input 230, which interlock would also include an acknowledgment informing computer 160 that the position has been reset for the position reference or set point or target, such as the enable 240. Such enable 240 is connected to computer 160 through an isolator 270 and part of the digital bus 260' connecting to computer 160. For further safety in operating the output device 210, an enable or switch 250 for the power 260 of the servo or other output device 220 may also be included which through an isolator 270 may be connected to permit contact 280 to power lines 285 to be enabled to permit the servo or other output device 220 to operate. The same technique of using a relay 290 (FIG. 2) may be used for hydraulic or pneumatic power sources (not shown) which could also be used as the power source for output device 220 to receive the output from the driver 210.

The SARA 12 through lines 11, and encoder 150 through lines 11, also includes other status inputs to the computer 160, such as the SARA or input device 12 being ready to be read. Processor 160 is preferably equipped with interrupts as part of the input lines 11 for the real time clock, a signal that the data for the SARA 12 are ready and for information from the serial line 180, such as a request to supply data from the computer 160 to the hierarchy 200.

Figure 9:
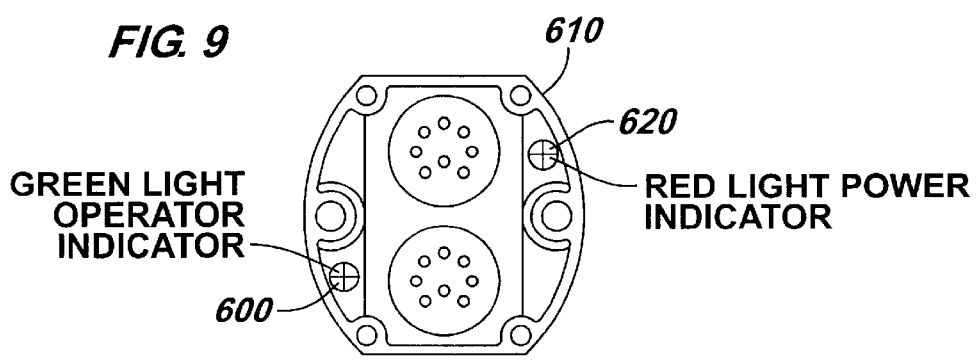
FIG. 9 is an end view of the end cap of the preferred embodiment of the present invention.

The interrupts also permit hierarchy computer 200 to send/receive parameters over lines 180 to computer 160, such as control parameters and remote targets or setpoints. As shown in FIG. 7, the commands from the hierarchy 200 include setup commands for various parameters of data stored 500, commands to read 510 the position of the input 11, write commands 520 for a new target and velocity limit, stop 530 of all proceedings, inhibit command 540 for the servo drive and enable command 550 for the servo drive, all of which are acknowledged from computer 160 to hierarchy 200. In addition, as shown in FIG. 2, the computer 160 will also have digital output lines 300 connected to a buffer 310' to show the status by LED 600 mounted in the end cap 610 (FIG. 9) of the system 1. The operator indicator LED shows faults such as a failure to be able to read the data (which is usually indicated by SARA 12), the enable 240 not being set and the like. The end cap also includes a second LED 620, indicating power 170 is on.

Figure 3:
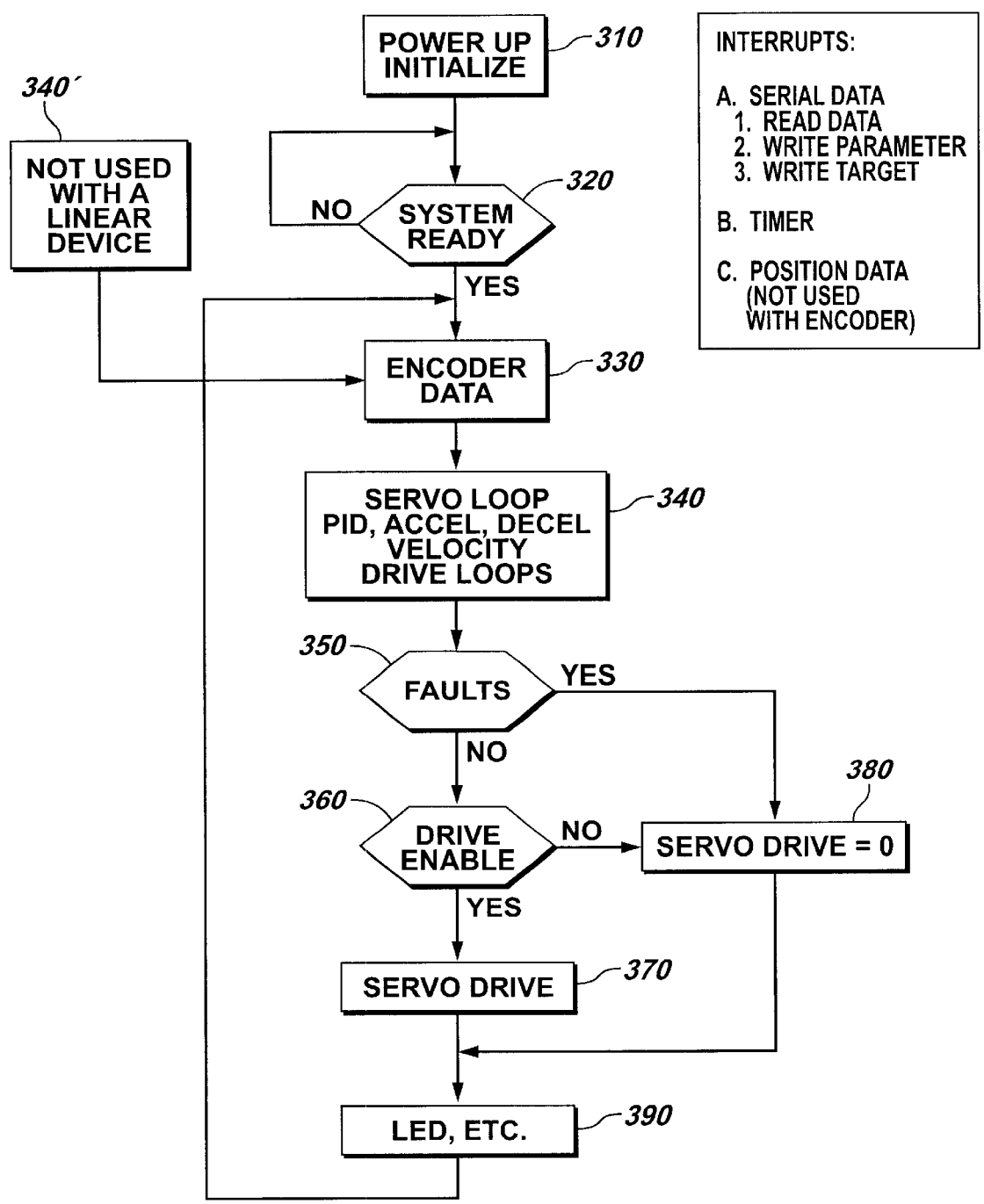
FIG. 3 is a flow chart for the programming of the control system of FIG. 2.
Figure 4:
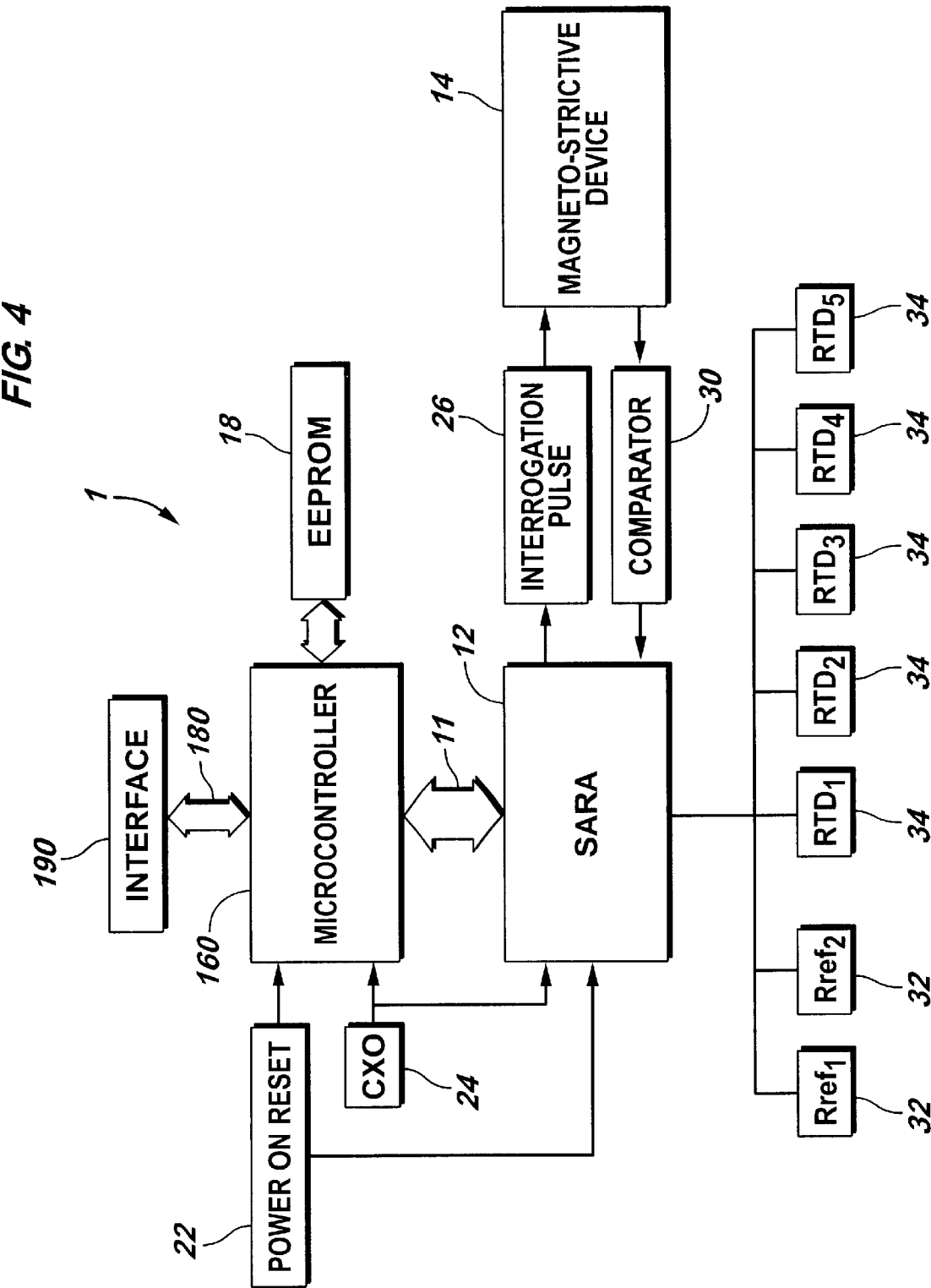
FIG. 4 is a block diagram of the SARA of the preferred embodiment of the present invention shown in conjunction with other elements as detailed in U. S. patent application Ser. No. 09/125,334, now U.S. Pat. No. 6,369,563, such drawing being FIG. 1 in such application.
Figure 6:
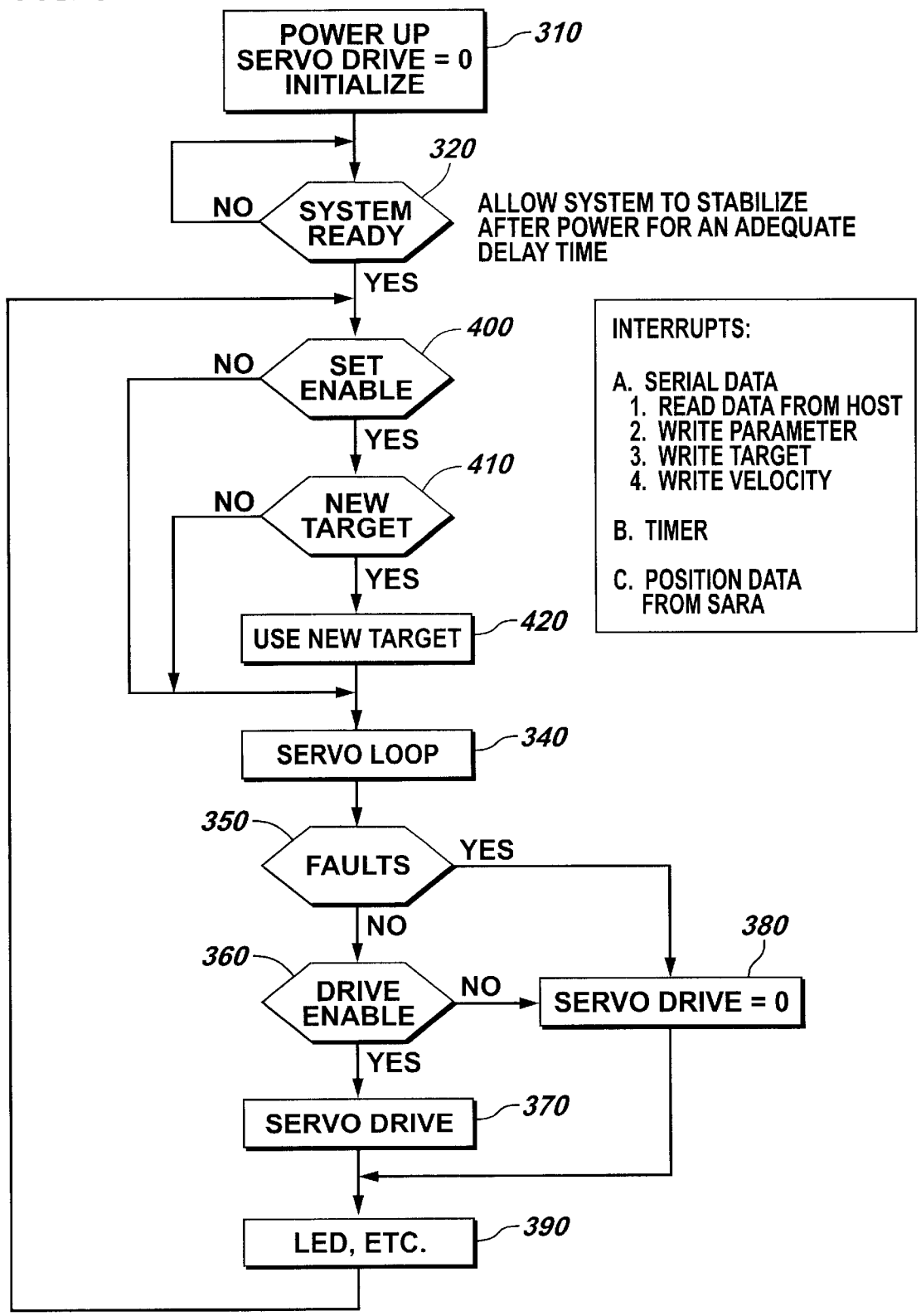
FIG. 6 is a flow chart for the programming of the control system of FIG. 1 with additional structures from FIG. 2.

Referring to FIGS. 3 and 6, there is shown program flow charts for the controller 1. When power 170 is supplied to computer 160, the power causes an initialization 310 of the computer 160 as is well known in the art. The computer 160 then tests if it is ready 320, which is an internal check. If it is not ready it pauses until it is ready. If it is ready, then the next step depends on whether there are encoder 150 data or SARA 12 data. If there is SARA 12 data (FIG. 6), then the interrupt software routine has already placed the position data in the computer system. Otherwise, as shown in FIG. 3, the encoder data 330 is read. If SARA 12 data is used, the encoder data step 330 (FIG. 3) is ignored 340'. After the data are obtained, for the SARA 12 as further described in U.S. patent application Ser. No. 09/125,334, now U.S. Pat. No. 6,369,563, now published, or from the encoder as is well known in the art in the reference cited in the Background, the computer 160 then tests 400 the set enable 240 and checks 410 if a new target has been entered. If the enable is on and if the new target is there, the new target 230, or the target acquired by the serial system 180 from the hierarchy 200, is used 420. This same sequence could be used in FIG. 3. The computer 160 then uses an appropriate algorithm to calculate the control. The control calculations include a standard three mode control algorithm, and appropriate calculations of acceleration and deceleration (especially where heavy loads are involved) and velocity limits for step changes and drive limits for total drive, including such things as preventing reset windup, all this is well known in the art, such calculation being designated on FIGS. 3 and 6 by the indicator 340. Once the data have been calculated with respect to the setting of the output drive 210, the system 1 then tests for faults 350, such as the SARA 12 still being reliable. If there are no faults, then the system 1 tests to see if the drive 210 has been enabled 360 through switch 250. If there are no faults 350 and if the drive has been enabled 360, then the computer 160 permits an output 370 to the drive 210 to move the system 1 in control. If the faults 350 exist or if the drive is not enabled 360, the computer 160 sets the output 380 to not change the drive 210 until ennoblement or a clearing of the faults occurs. In either case, the status of the system as calculated by computer 160 from reading the various digital inputs to it, is outputted 390 to buffer 310 by line 300 to indicate either a normal operation or a fault.

NORMAL OPERATION

During normal operations of control 1, hierarchy 200 serially reads position and status data 510 every few milliseconds so hierarchy 200 knows that the system 1 is properly functioning. Preferably the control 1 runs every 500 microseconds to 1 millisecond.

When a new target is necessary, hierarchy 200 sends target and velocity commands 520 one time. If computer 160 acknowledges the new target the hierarchy 200 returns to reading position and status.

SAFETY FEATURES

The system has two independent control lines for control of a servo/proportional valve output device 220. One line is called the set enable 240. The other is called servo control enable 250. The controller 1 also monitors communications between hierarchy 200 and itself along with internal monitoring. The following discussion relates to hydraulic control as one embellishment.

SET ENABLE INPUT

The set enable 240 is a discrete input provided by the hierarchy 200 that allows the controller 1 to accept target information and in turn will allow movement. When the set enable 240 is low, the controller 1 will not accept target information and the cylinder 700 will maintain its targeted position. When the enable 240 is high, the controller 1 will accept target information and immediately cause the cylinder 700 to move the arm 70 to a new position.

The set enable 240 can be tied in with some external device, such as a proximity switch or photo eye or limits switch (not shown). The user can position these devices in such a way as to prevent movement in danger areas or create zones for movement.

The set enable 240 has two programmable modes. The first mode works as follows: When the set enable 240 is applied and a target is sent to the controller 1, the set enable 240 can be removed and the cylinder 700 will continue and finish its targeted movement. The second mode works as follows: When the set enable 240 and a target is sent to the computer 160, the cylinder 700 will move to its targeted movement. If set enable 240 is removed at any point during movement, the cylinder 700 will stop at the position it is at in the move. To start movement again the set enable 240 and a new target will be required. In conclusion, for this mode of operation, the set enable 240 must be active for the duration of movement to target.

Under all conditions with or without the set enable input 240, the controller 1 will maintain or try to maintain its position target.

CONTROL INPUT (E-Stop)

The control 1 input controls a relay located in the end cap 610 of the controller 1. A normally open contact controls the power to the output device 220 or the command lines to the output device 220. These options are output wireable within the connector (not shown) at controller 1. The control is designed for 24v dc.

Generally, when 24v dc power is removed from output devices 220, the spool (not shown) inside of the output device 220, assumes a "fourth" position. This position blocks the pressure and tank ports, thus no pressured oil is applied to the cylinder 700. The relay contact could be used to power the output device 220.

All hydraulic systems using servo valves 220 should have a hydraulic lock up valve 220 installed if the system needs an external e-stop. The control for this valve should be external to controllers 1. The valve must be activated for applying hydraulics to the cylinders 700. When inactive, hydraulic pressure is removed from the cylinder/s 700.

STATUS/FAULT CONTROL (350)

The controllers 1 also send status bits to the hierarchy 200 when used. Through software, this word can be used to control hydraulics, provide status of the hardware and fault information. The following is an explanation of the bit structure for the status word.

| | | | |
|---|---|---|---|
| Bit 0 | Sensor 12 | High. | When low Sensor Bad. When this condition occurs, the servo drive output goes to zero. |
| Bit 1 | Position Window | High. | When low, target and actual position are not within programmed window. |
| Bit 2 | System Enable | High. | When low, control 1 failure. When this condition occurs, the drive output goes to zero. |
| Bit 3 | Overtravel | Low. | High means the target information has exceeded the programmed stroke limits. The servo drive output will remain at zero. |
| Bit 4 | Null Okay | Low. | High means the servo drive output has exceeded 10% of drive to keep the cylinder within the position window. |
| Bit 5 | Future | | |
| Bit 6 | Set Enable | High. | Servo controller acknowledgment of the Set Enable input. |
| Bit 7 | Future | | |

Listed below are internal faults that cause the output device drive to go to zero:
SENSOR BAD
BAD MODULE
BAD COMMUNICATIONS
OVERTRAVEL

LED (600) VISUAL FAULT (390) INDICATIONS LOCATED AT PROBE END CAP (610) GREEN LED 600-PULSED TO SHOW STATUS

A. 1 sec ON, 1 sec OFF System OK and position is within IN position window from target B. ½ sec ON, ½ sec OFF System OK, but not within IN position window C. ½ sec ON, 1½ sec OFF Error—no position data D. 1½ sec ON, ½ sec OFF Error—no communication with external host E. Stays on=error, system not running F. Stays off=error, system not running All of the features of a particular preferred embodiment of the control assembly are not shown in the above disclosure in order to emphasize the generality of the disclosure.

Because many varying and different embodiments may be made with the scope of the invention concept taught herein which may involve many modifications in the embodiments herein detailed in accordance with the descriptive requirements of the law, it is to be understood that the details herein are to be interpreted as illustrative and not in a limiting sense.

What is claimed is:

1. A magnetostrictive sensor and control apparatus for controlling a variable of a device by an end element, comprising:

a housing;

a magnetostrictive position sensing probe in said housing for measuring the value of a variable of the device, reading the value from said magnetostrictive position sensing probe at time intervals, and a digital controller located in said housing having an output and means for calculating control output from the updated value of the variable during said time interval.

2. The apparatus of claim 1, wherein said magnetostrictive position sensing probe includes a digital output signal converter in the housing providing said updated value to said digital controller.

3. The apparatus of claim 1, wherein there is included:
a hierarchical system; and
said controller includes means for communicating data to and from said hierarchical system.

4. The apparatus of claim 1, wherein said magnetostrictive position sensing probe is close coupled within said housing by a coupling to said digital controller.

5. The apparatus of claim 1, wherein said time intervals are regular.

6. The apparatus of claim 2, wherein said digital output signal converter is a SARA.

7. The apparatus of claim 3, wherein said means for communicating data includes means for communicating a set points for the variable.

8. The apparatus of claim 4, wherein said coupling includes:
said housing includes an enclosure enclosing said magnetostrictive position sensing probe;
a cap at the end of said enclosure; and
said digital controller being enclosed in said cap.

9. The apparatus of claim 8, wherein said digital controller is microsized.

10. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
a hierarchical system; and
said controller includes means for communicating data to and from said hierarchical system;
wherein said means for communicating data includes means for communicating a set points for the variable;
wherein said output is responsive to said set point and the value to adjust the end element to adjust the value of the variable.

11. The control system of claim 10, wherein said output includes an output driver.

12. The control system of claim 11, wherein said output driver is an analog output driver.

13. The control system of claim 11, wherein said output includes a safety interlock.

14. The control system of claim 11, wherein said controller tests for change and limits the amount of change to said output driver.

15. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
wherein said magnetostrictive position sensing probe is close-coupled by a coupling to said digital controller;
wherein said coupling includes:
an enclosure enclosing said magnetostrictive position sensing probe;
a cap at the end of said enclosure; and
said digital controller being enclosed in said cap;
wherein said output includes an LED mounted in said cap.

16. A control system for controlling a variable of a device by an end element, comprising:
a magnetostrictive position sensing probe for measuring the value of a variable of the device, reading the value from said magnetostrictive position sensing probe at time intervals, and
a digital controller having an output and means for calculating control output from the updated value of the variable during said time interval;
wherein said magnetostrictive position sensing probe includes a digital output signal converter providing said updated value to said digital controller,
wherein said digital output signal converter is an encoder.

17. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
wherein said digital controller includes output acceleration limits.

18. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
wherein said digital controller includes output deceleration limits.

19. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
wherein said digital controller includes output velocity limits.

20. A control system for controlling a variable of a device by an end element, comprising:
a magnetostrictive position sensing probe for measuring the value of a variable of the device, reading the value from said magnetostrictive position sensing probe at time intervals;
a digital controller having an output and means for calculating control output from the updated value of the variable during said time interval;
wherein said digital controller includes output drive limits.

21. A control system for controlling a variable of a device by an end element, comprising:
a magnetostrictive position sensing probe for measuring the value of a variable of the device, reading the value from said magnetostrictive position sensing probe at time intervals;

a digital controller having an output and means for calculating control output from the updated value of the variable during said time interval;

wherein said digital controller includes a tester to test for proper operation of said magnetostrictive position sensing probe.

22. A control system for controlling a variable of a device by an end element, comprising:

a magnetostrictive position sensing probe for measuring the value of a variable of the device, reading the value from said magnetostrictive position sensing probe at time intervals;

a digital controller having an output and means for calculating control output from the updated value of the variable during said time interval;

wherein said time intervals are short time intervals.

23. The control system of claim 22, wherein said short time interval is one millisecond or less.

24. The control system of claim 22, wherein said short time interval is 500 microseconds or less.

25. A control system for controlling a variable of a device by an end element, comprising:

a magnetostrictive position sensing probe for measuring the value of a variable of the device, reading the value from said magnetostrictive position sensing probe at time intervals; and a digital controller having an output and means for calculating control output from the updated value of the variable during said time interval;

wherein said digital output signal converter is a SARA;

wherein said digital controller includes a tester to test for proper operation of said SARA.

* * * * *